US007499949B2

(12) United States Patent
Barton

(10) Patent No.: US 7,499,949 B2
(45) **Date of Patent: *Mar. 3, 2009**

(54) METHOD AND SYSTEM FOR OBTAINING RECURRING DELAY DATA USING NAVIGATION SYSTEMS

(75) Inventor: Mark Barton, Schaumburg, IL (US)

(73) Assignee: Navteq North America, LLC, Chicago, IL (US)

( * ) Notice: Subject to any disclaimer, the term of this patent is extended or adjusted under 35 U.S.C. 154(b) by 233 days.

This patent is subject to a terminal disclaimer.

(21) Appl. No.: 10/342,677

(22) Filed: Jan. 15, 2003

(65) Prior Publication Data

US 2004/0030670 A1 Feb. 12, 2004

Related U.S. Application Data

(63) Continuation-in-part of application No. 10/214,216, filed on Aug. 7, 2002, now Pat. No. 7,433,889.

(51) Int. Cl.
*G06F 7/00* (2006.01)

(52) U.S. Cl. ...................................... 707/104.1; 702/17

(58) Field of Classification Search .............. 707/104.1; 701/209, 213, 301; 340/919, 994; 702/17; 342/451; 455/456.1
See application file for complete search history.

(56) References Cited

U.S. PATENT DOCUMENTS 3,739,332 A * 6/1973 Martinez .................... 340/919
4,220,946 A * 9/1980 Henriot ...................... 340/994
4,982,332 A 1/1991 Saito et al.
5,173,691 A 12/1992 Sumner
5,181,250 A * 1/1993 Morgan et al. .............. 704/270
5,444,442 A * 8/1995 Sadakata et al. ............ 340/916
5,539,645 A 7/1996 Mandhyan et al.
5,699,056 A 12/1997 Yoshida
5,931,888 A 8/1999 Hiyokawa
5,933,100 A 8/1999 Golding
6,047,234 A 4/2000 Cherveny et al.
6,150,961 A 11/2000 Alewine et al.
6,154,152 A 11/2000 Ito
6,178,374 B1 1/2001 Mohlenkamp et al.
6,202,024 B1 3/2001 Yokoyama et al.
6,236,932 B1 5/2001 Fastenrath
6,236,933 B1 5/2001 Lang
6,263,276 B1 7/2001 Yokoyama et al.
6,292,719 B1 9/2001 Seto et al.
6,292,747 B1 9/2001 Amro et al.
6,295,492 B1 9/2001 Lang et al.
6,334,086 B1 12/2001 Park et al.
6,338,021 B1 * 1/2002 Yagyu et al. ................ 701/209

(Continued)

FOREIGN PATENT DOCUMENTS

WO WO 98/54682 12/1998
WO WO 00/54143 9/2000

*Primary Examiner*—Apu M Mofiz
*Assistant Examiner*—Susan Y Chen
(74) *Attorney, Agent, or Firm*—Jon D. Shutter; Frank J. Kozak; Lisa M. Schoedel

(57) ABSTRACT

A method for collecting data for a geographic database is disclosed. Speed and position data are collected using a plurality of mobile computing platforms moving in a geographic region. The speed and position data are analyzed to identify a location of a recurring delay point corresponding to a change in the speed. The geographic database is updated to indicate the location of the recurring delay point.

23 Claims, 10 Drawing Sheets

U.S. PATENT DOCUMENTS

| | | | | |
|---|---|---|---|---|
| 6,385,539 | B1 | 5/2002 | Wilson et al. | |
| 6,429,812 | B1 * | 8/2002 | Hoffberg | 342/357.1 |
| 6,470,262 | B2 | 10/2002 | Kerner et al. | |
| 6,526,352 | B1 * | 2/2003 | Breed et al. | 701/213 |
| 6,560,532 | B2 * | 5/2003 | Cayford | 701/209 |
| 6,577,946 | B2 * | 6/2003 | Myr | 701/117 |
| 6,700,124 | B1 * | 3/2004 | Mekata et al. | 250/351 |
| 2002/0156572 | A1 | 10/2002 | Bullock et al. | |

* cited by examiner

METHOD AND SYSTEM FOR OBTAINING RECURRING DELAY DATA USING NAVIGATION SYSTEMS

This application is a continuation-in-part of application Ser. No. 10/214,216 filed Aug. 7, 2002 now U.S. Pat. No. 7,433,899.

BACKGROUND OF THE INVENTION

The present invention relates to collecting geographic data for a geographic database and more particularly, the present invention relates to a method and system for collecting recurring delay data for a geographic database using navigation systems.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on. A geographic database may also include information about points of interest in a region. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic signals are installed, and turn restrictions are added to existing roads. Also, new levels of detail may be added about geographic features that are already represented in an existing geographic database. For example, an existing geographic database for roads may be enhanced with information about lane widths, shoulder sizes, traffic signs, lane barriers, address ranges, sidewalks, bicycles paths, etc. Thus, there exists a need to continue to collect information for a geographic database.

One type of information that is useful to include in a geographic database is information relating to delays on the roads. On certain roads, most drivers may experience similar delay points, that is, the drivers may have to stop or reduce the speed of their vehicles at certain points on the road. For example, drivers traveling along the road may have to stop at a traffic signal or railroad crossing or reduce their speed for a school zone. Prior methods have required field personnel from a geographic database developer to travel along each street in a geographic region, observe the traffic signs, railroad crossings or school zones, record their observations and then add the traffic sign, railroad crossing and/or school zone information to the geographic database. This process is relatively time-consuming and therefore relatively expensive.

Accordingly, it would be beneficial to collect recurring delay information more efficiently.

SUMMARY OF THE INVENTION

To address these and other objectives, the present invention comprises a method and system for obtaining recurring delay point data for a geographic database. Speed and position data are collected using a plurality of mobile computing platforms moving in a geographic region. The speed and position data are analyzed to identify a location of a recurring delay point corresponding to a change in the speed. The geographic database is updated to indicate the location of the recurring delay point.

DETAILED DESCRIPTION OF THE PRESENTLY PREFERRED EMBODIMENTS

I. Geographic Database

Figure 1:
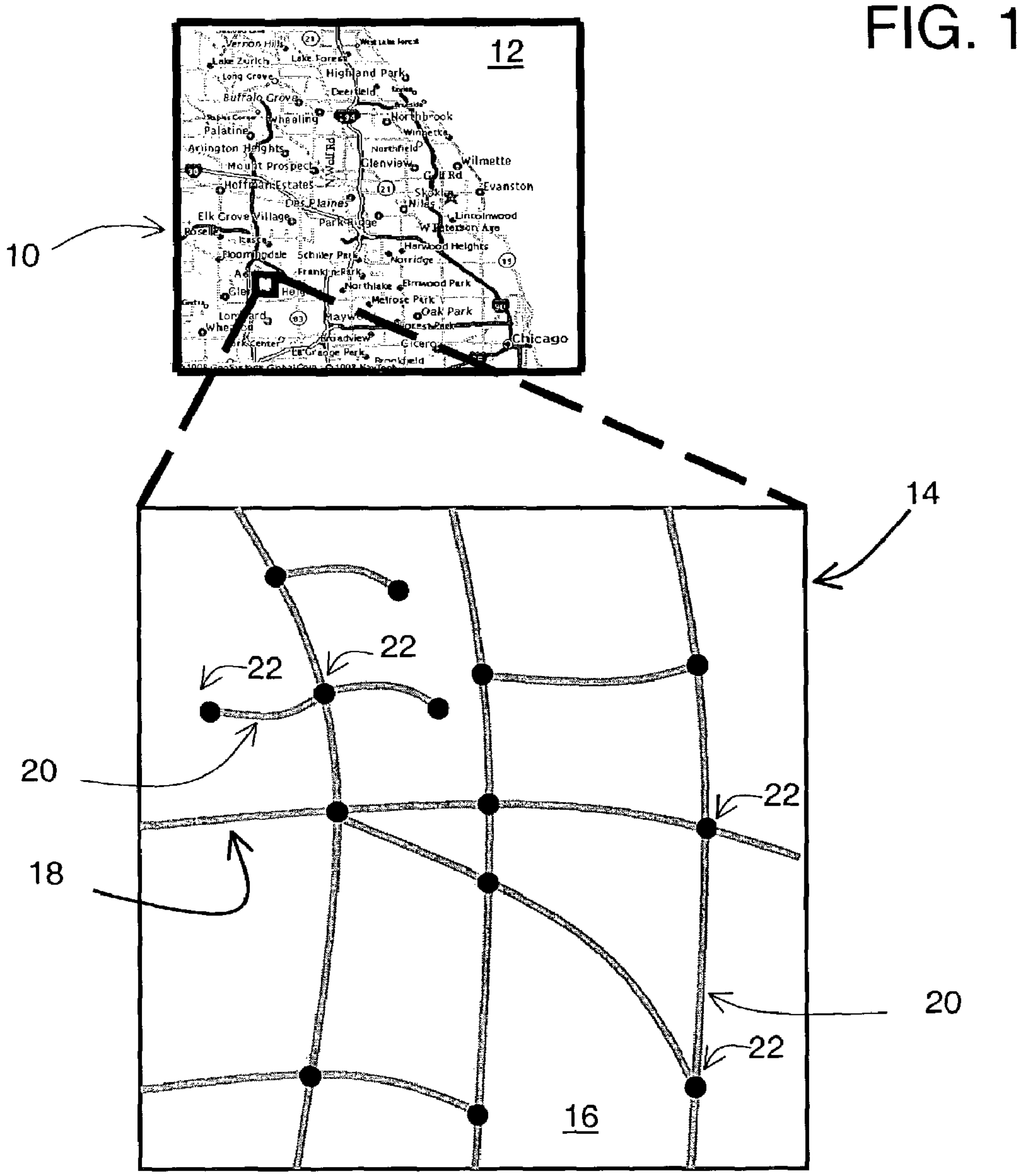
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node at either end of a road segment may correspond to a location at which the road meets another road, i.e., an intersection, or where the road dead-ends.

Figure 2:
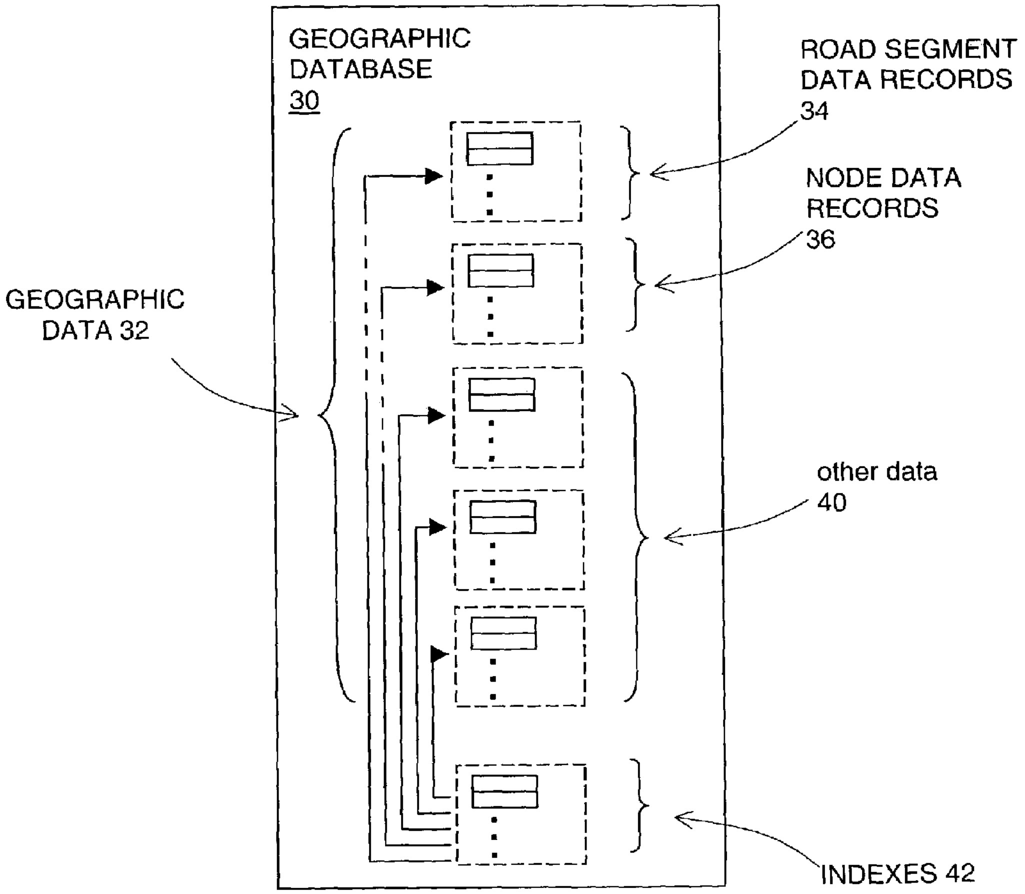
FIG. 2 is a block diagram of a geographic database that represents the geographic region of FIG. 1.

Referring to FIG. 2, a geographic database 30 contains data 32 that represents some of the physical geographic features in the geographic region (12 in FIG. 1). The data 32 contained in the geographic database 30 includes data that represent the road network 18. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The geographic database 30 may also include other kinds of data 40. The other kinds of data 40 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 30 also includes indexes 42. The indexes 42 may include various types of indexes that relate the different types of data to each other or that relate to other aspects of the data contained in the geographic database 30.

Figure 3:
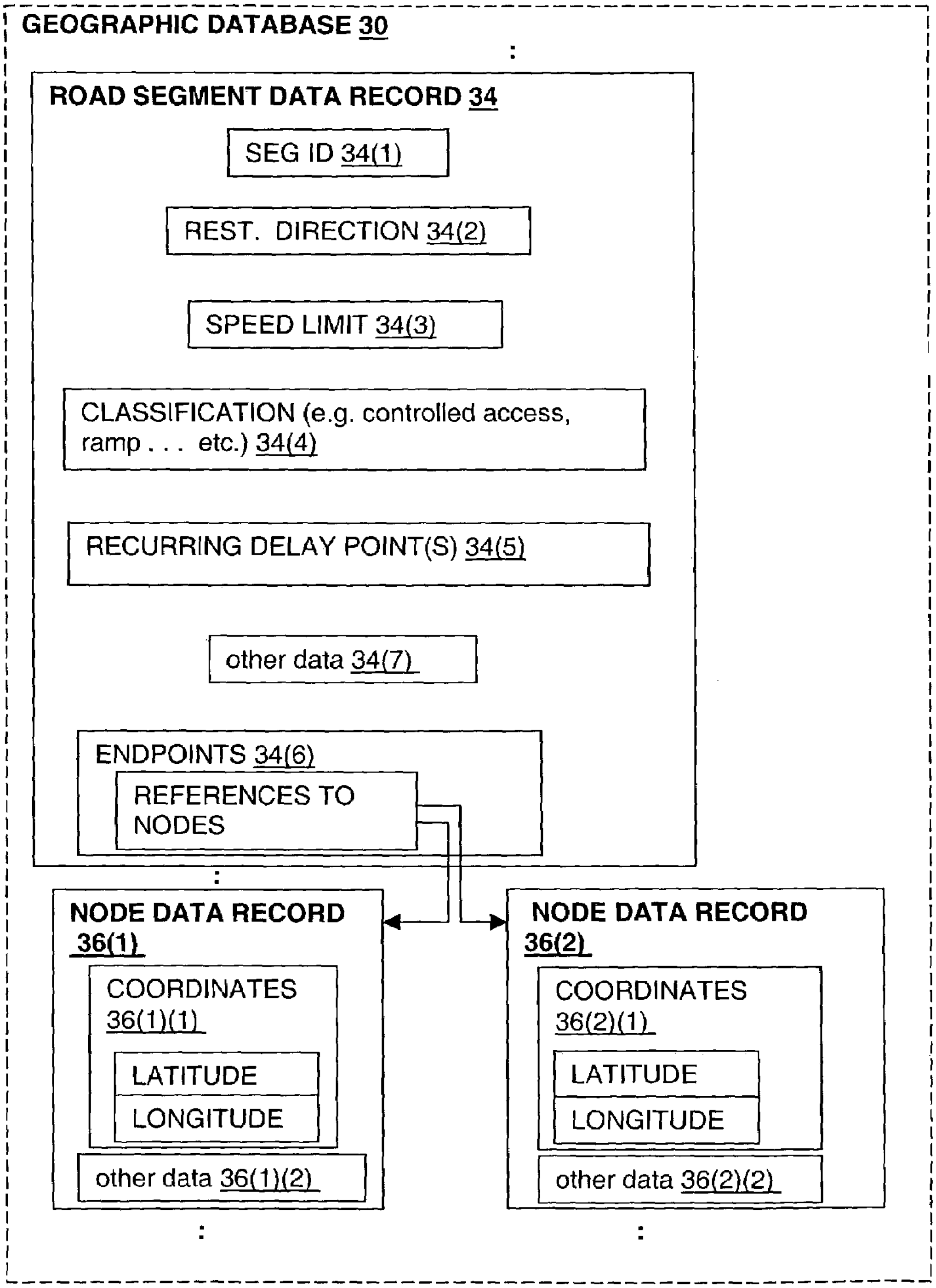
FIG. 3 is a block diagram showing a road segment data record contained in the geographic database of FIG. 2.

FIG. 3 shows some of the components of a road segment data record 34 contained in the geographic database 30. The road segment record 34 includes a segment ID 34(1) by which the data record can be identified in the geographic database 30. Each road segment data record 34 has associated with it information (such as "attributes", "fields", etc.) that describes features of the represented road segment. The road segment data record 34 may include data 34(2) that indicate the restrictions, if any, on the direction of vehicular travel permitted on the represented road segment. The road segment data record 34 includes data 34(3) that indicate a speed limit or speed category (i.e., the maximum permitted vehicular speed of travel) on the represented road segment. The road segment data record 34 may also include data 34(4) indicating whether the represented road segment is part of a controlled access road (such as an expressway), a ramp to a controlled access road, abridge, a tunnel, a toll road, a ferry, and so on.

The road segment record 34 may also include recurring delay point data 34(5) that indicate the presence of a recurring delay on the road segment. The recurring delay point data 34(5) will be described in greater detail below in conjunction with FIG. 8. Briefly, recurring delay points represent delays at locations on the road segment at which the end user may have to reduce speed and/or stop. End users traveling on a road segment experience delays from a variety of causes including roadside traffic control devices, such as stop signs and traffic lights, road segment geometry, such as curves and hills, road hazards, such as speed bumps and potholes, school zones, railroad crossings, frequent turn locations, such as for points of interest, and other locations at which the end user may have to reduce speed and/or stop. Rather than identifying the cause of each of the delays associated with the road segment, such as identifying the stop sign, school zone or railroad crossing in the data record, the recurring delay point data provides the characteristic delay pattern typically experienced by end users at the recurring delay point. Generally, the recurring delay point 34(5) data identifies the location and the amount of delay time associated with that location on the road segment.

The road segment data record 34 also includes data 34(6) providing the geographic coordinates (e.g., the latitude and longitude) of the endpoints of the represented road segment. In one embodiment, the data 34(6) are references to the node data records 36 that represent the nodes corresponding to the endpoints of the represented road segment. The road segment data record 34 may also include or be associated with other data 34(7) that refer to various other attributes of the represented road segment. The various attributes associated with a road segment may be included in a single road segment record, or may be included in more than one type of record which are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 36 may have associated information (such as "attributes", "fields", etc.) that allows identification of the road segment(s) that connect to it and/or its geographic position (e.g., its latitude and longitude coordinates). For the embodiment shown in FIG. 3, the node data records 36(1) and 36(2) include the latitude and longitude coordinates 36(1)(1) and 36(2)(1) for their node. The node data records 36(1) and 36(2) also include other data 36(1)(2) and 36(2)(2) for their node.

The data records 34 in the geographic database 30 that represent roads may not necessarily include all the same types of data attributes. One reason for this is that roads do not all have the same properties. For example, some roads have a highway designation (e.g., "Wisconsin State Highway 120") whereas other roads do not. Another reason why data records in the geographic database 30 that represent roads may not have the same data attributes is that some of the properties of a road may not have been collected or confirmed. Collecting data about roads for a geographic database may involve multiple steps. For example, road geometry data may be obtained using aerial photographs and then, recurring delay data are obtained by physically driving along the roads and recording the observed recurring delay points. Additionally, the recurring delay data may be collected using the navigation systems as described below.

In one embodiment, recurring delay data are obtained for all the roads represented in the geographic database. In another embodiment, recurring delay data are included for only some of the roads represented in the geographic database. According to this latter embodiment, some of the roads are represented by data records that do not include recurring delay data. The roads that are represented by data records that do not include recurring delay data may include only road geometry data. These may be roads for which geometry data were obtained from aerial photographs, but for which recurring delay data may not yet have been collected.

II. System for Obtaining Recurring Delay Point Data

A. Navigation System

Figure 4:
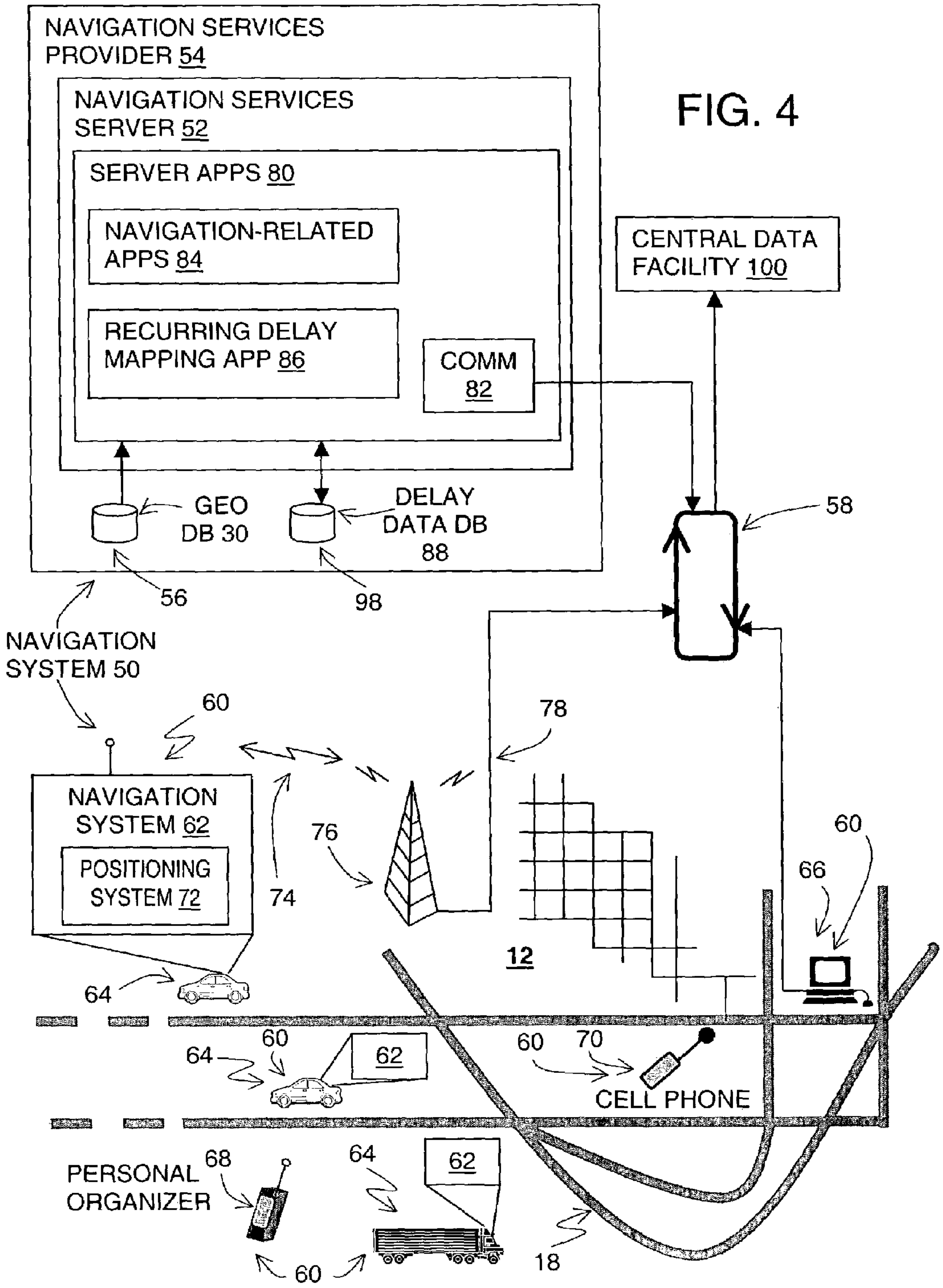
FIG. 4 is a diagram of a navigation system located in the geographic region of FIG. 1.

FIG. 4 shows the geographic region 12 and a portion of the road network 18. A navigation system 50 serves end users (e.g., vehicle drivers and passengers, as well as other persons) in the geographic region 12. The navigation system 50 is used by the end users to obtain navigation-related services (including map-related services) with respect to the geographic region 12. The navigation-related services include information about travel along the road network 18, including route calculation and guidance, people and business finding services (e.g., electronic yellow and white pages), maps, point of interest searching, destination selection, and so on.

The navigation system 50 is a combination of hardware, software and data. The navigation system 50 includes remote components (i.e., hardware, software or data located at a central location that is remote from the end users) and local components (i.e., hardware, software, or data located physically with each end user).

Included among the remote components of the navigation system 50 is a navigation services server 52. The navigation services server 52 includes appropriate computer hardware and software to run network applications. The navigation services server 52 is maintained and operated by a navigation services provider 54.

Associated with the navigation services server 52 is the geographic database 30. The geographic database 30 is stored on a storage medium 56 that is accessible to the navigation services server 52. The storage medium 56 may include one or more hard drives or other storage media. The geographic database 30 may be organized to facilitate performing navigation-related functions. Methods of organizing a geographic database to enhance the performance of certain navigation-related functions are described in U.S. Pat. Nos. 5,974,419, 5,968,109 and 5,953,722 the entire disclosures of which are incorporated by reference herein. In one embodiment, the geographic database 30 is developed by NAVTEQ (formally Navigation Technologies Corporation) of Chicago, Ill. However, it is understood that the inventive concepts disclosed herein are not restricted to any particular source of data.

The local components of the navigation system 50 include the various computer platforms 60 operated by the end users to request and obtain navigation-related and map-related features and geographic data from the navigation services provider 54. These various computer platforms 60 (also referred to as "end user computing platforms" or "client computing platforms") may include navigation system units 62 located in vehicles 64, personal computers 66, personal organizers (e.g., PDAs, PalmPilot®-type devices) 68, wireless phones 70, or any other types of computing devices that have the appropriate hardware and software to access the navigation services provider 54 over a data network 58.

Referring to the embodiment of FIG. 4, some of the end user computing platforms 60 include positioning equipment 72. The positioning equipment 72 may include a GPS system, inertial sensors, wheel pulse sensors, etc. Using this positioning equipment 72, the position of the end user's computing platform 60 can be determined. Methods for determining position are disclosed in U.S. Pat. No. 6,192,312, the entire disclosure of which is incorporated by reference herein. Some of the end user computing platforms 60 also include speed equipment to measure the speed of the vehicle. The speed equipment may include an odometer, speed pulse sensor, compass or other components that sense the speed, orientation, direction, angular acceleration, and so on.

The data network 58 may use any suitable technology and/or protocols that are currently available, as well as technology and/or protocols that become available in the future. For example, the data network may use WAP, TCP/IP, etc. More than one protocol may be used in the data network 58 with appropriate conversions. The data network 58 may be part of, or connected to, the Internet.

A portion of the network 58 may include a wireless portion 74. The wireless portion 74 of the data network 58 enables two-way communication between the mobile end user computing platforms 60 and the service provider 54. The wireless portion 74 may be implemented by any suitable form of wireless communication, including cellular, PCS, satellite, FM, radio, or technologies that may be developed in the future. The wireless portion 74 may include one or more transmitters 76, such as a transponder tower, an antenna tower, an FM tower, satellites, or other suitable means. The transmitters 76 include an appropriate communication link 78 to the network 58 and/or service provider 54. This link 78 may be land-based or may be wireless. The transmitters 76 include suitable technology that enables two-way communication between the service provider 54 and the mobile end user computing platforms 60.

The navigation system 50 of FIG. 4 can accommodate different types of end user computing platforms 60. The navigation system 50 allows end users who have different types of computing platforms 60 to obtain navigation services from the navigation services provider 54 and to obtain and use geographic data provided from the navigation services provider 54. Using data that indicate the end user's positions from the position equipment 72 of the end user computing platforms 60, the navigation services server 52 may provide navigation-related services with respect to the geographic region 12.

Referring to FIG. 4, server applications 80 are included on the navigation services server 52 of the navigation services provider 54. The server applications 80 may be stored on one or more hard drive(s) or other media operated by the server 52 and loaded into a memory of the server 52 to run. One of the server applications 80 is a communications application 82. The communications application 82 interfaces with the data network 58 in order to receive messages from and send messages to the end users.

Included among the server applications 80 are navigation-related applications 84. The navigation-related applications 84 use the geographic database 30 associated with the navigation services server 52 in order to provide the various different types of navigation-related services. In order to provide navigation-related features, the navigation-related applications 84 use data from the geographic database 30.

One of the navigation-related applications 84 is a route calculation application. End users may access the navigation services provider 54 to obtain a route from an origin to a destination. The route calculation application determines the route for the end user to travel along the road network 18 to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, it accesses the geographic database 30 and obtains data that represent road segments around and between the starting location and the destination location. The road calculation application uses the data to determine at least one valid solution route from the starting location to the destination location.

In one embodiment, the route calculation application may attempt to find a solution route that takes the least time to travel. Each of the road segment data records 34 of the geographic database 30 has an associated default segment cost or travel time for the particular represented road segment. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Another of the navigation-related applications 84 on the navigation services server 52 is a route guidance application. The route guidance application uses the output from the route calculation application to provide maneuver instructions for the end user to travel to the desired destination on the calculated route. The route guidance application generates an output comprised of a series of maneuvers derived from the list of road segments provided in the output of the route calculation application. The output of the route guidance application is provided to the end user through a user interface included on the computing platform 60. The output of the route guidance may be conveyed audibly through speech synthesis or on a visual display. Using data that indicate the end user's positions, the route guidance application on the navigation services server 52 determines the appropriate times and locations at which to provide maneuvering instructions. The route guidance maneuvers instruct the end user to turn in a specified direction at specified nodes connecting road segments of the route. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

Referring to FIG. 4, end users are located throughout and move about the geographic region 12. The end users use various means of transportation to move in the geographic region 12. For example, end users may use automobiles, trucks, buses, bicycles, motorcycles, trains, taxis, horses, and so on. As the end users move throughout the geographic region, they use mobile or portable computing platforms 60 to obtain geographically-related services and features. The end users may communicate with the navigation services server 52 over the data network 58 to implement the geographic-related services and features.

Figure 5:
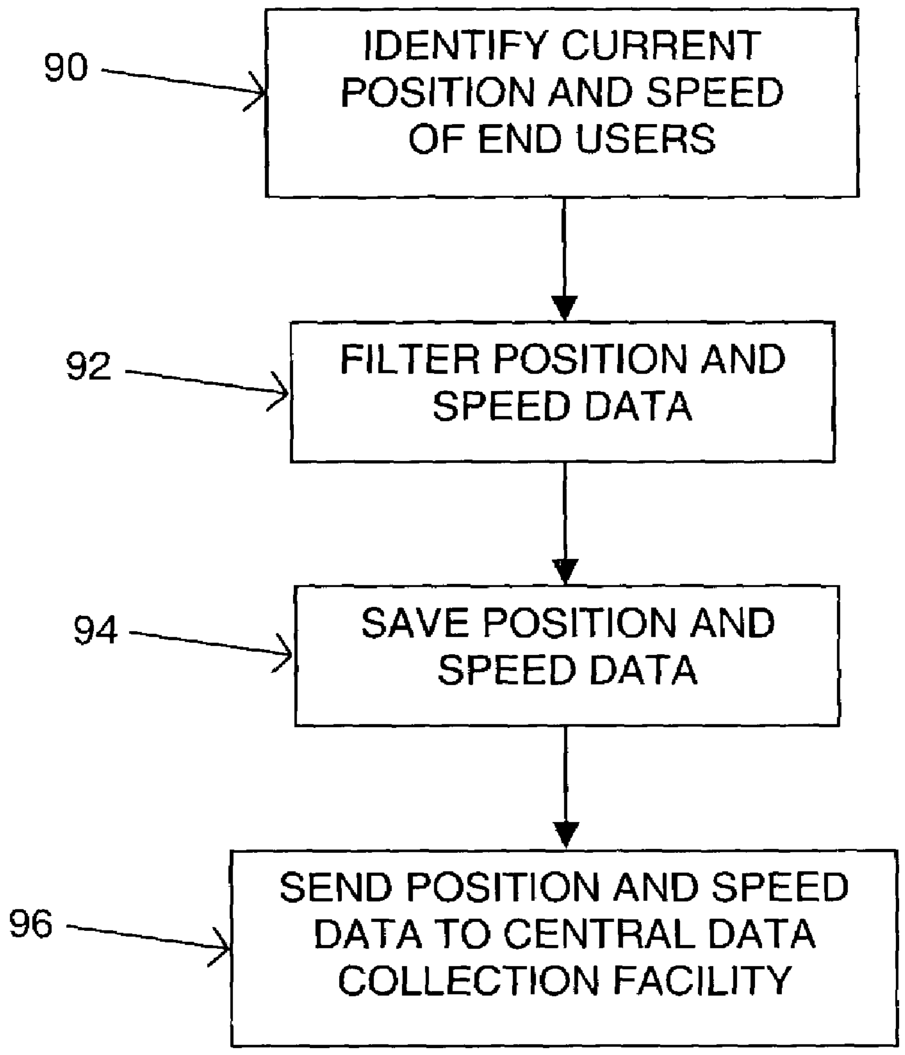
FIG. 5 is a flow chart of the operations of a navigation services server for collecting recurring delay point data.

While providing the geographic-related services and features to the end users, the navigation services provider 54 may collect recurring delay data. Included among the server applications 80 on the navigation services server 52 is a recurring delay mapping application 86. The recurring delay mapping application 86 collects position and speed data of end users for identifying the locations and attributes of recurring delay points. FIG. 5 is a flow chart of the operations of the navigation services server 52 for collecting recurring delay data according to one embodiment. In the embodiment of FIG. 5, the recurring delay data collected comprises position and speed information of a number of end users moving in the geographic region 12. In addition to the speed and position data, in another embodiment, the data collected includes the time, day of week, date, weather conditions and traffic conditions. As the end users travel through the geographic region 18, the navigation services server 52 identifies the current position, current speed and any other information of the end users at step 90.

In one embodiment, the position of the end user may be determined by positioning equipment associated with the end user's computing platform (such as the positioning system 72 in FIG. 3). The position of the end user may be determined by other methods. For example, the position of the end user may be determined by network-based location identification (e.g., emergency 911 services). The position of the end user may also be determined by obtaining the end user's input. The navigation services server 52 receives the position data routinely, such as every second, via the data network 58. In an alternative embodiment, the navigation services server 52 may request position information from the end users via the data network 58.

The speed of the end user may be determined by speed equipment associated with the end user's computing platform. In another embodiment, the speed information may be represented as velocity data comprising both the magnitude component and a direction component. The navigation services server 52 receives the speed data routinely, such as every second, via the data network 58. In an alternative embodiment, the navigation services server 52 may request information from the end users via the data network 58. The speed of the end user may be determined by other methods. In one embodiment, the server 52 may determine both the speed and direction of travel using the position information. For example, the speed is calculated from the distance covered between the current position and the previous position, and from the elapsed time between the positions. The direction is a direction on the road segment from the previous position to the current position.

In an alternative embodiment, each end user's computing platform may identify its current position and speed frequently, such as every second, and temporarily record the current position and speed data along with a time. After a certain period of time, such as several minutes, the end user's computing platform transfers the recorded position and speed data to the navigation services server 52 via the data network.

In one embodiment, the time, day of week and date data corresponding to the position and speed data is provided by a clock associated with the end user's computing platform (such as the positioning system 72 in FIG. 4). Alternatively, the time and date data may be provided by a clock associated with the navigation services server 52. Additionally, weather information may be provided by weather sensors, such as a thermometer, barometer, wind speed and direction sensor and precipitation detector associated with the end user's computing platform. Alternatively, the navigation services server 52 may obtain weather information from a third party such as an Internet weather service provider for a given region. The navigation services server 52 identifies the weather conditions experienced by the end user by matching the end user's position with the weather for that region. Furthermore, traffic conditions may be provided by a traffic information service. The navigation services server 52 may obtain traffic conditions from the traffic information service through wireless broadcasts or the Internet. The navigation services server 52 identifies the traffic conditions experienced by the end user by matching the end user's position with the traffic for that road segment.

Referring to step 92 of FIG. 5, the navigation services server 52 filters the raw position and speed data from the end users into a filtered set of data according to specified filtering criteria. The filtering criteria may be selected such that the quality of the data can be assumed to have minimal random speed changes or stops not associated with recurring delay points. Additionally, the filtering criteria may be selected to identify recurring delay points in a particular portion of the geographic region. The navigation service server 52 saves the position and speed data meeting the filtering criteria and discards the position and speed data not meeting the filtering criteria. The filtering criteria may be established by the navigation services provider 54 or by the geographic database provider.

The filtering criteria may be a designated portion of the road network 18 such as a group of road segments represented in the geographic database 30. To filter the raw data according to the location filtering criteria, the navigation services server 52 saves the position and speed data of the end users whose position data is located on one of the selected represented road segments in the geographic database 30 and discards the other data. The filtering criteria may be specified portions of the road segments, such as near intersections. The filtering criteria may also be specific end users such as fleet vehicles or registered probe vehicles. In addition to receiving current position and speed information from the end users, the navigation services server 52 may receive information identifying the end users. The end user may be a registered user of the navigation services provider 54, and the identifying data received may be an end user ID. To filter the raw data according to the identity filtering criteria, the navigation services server 52 saves the position and speed data of the end users having the required IDs and discards the other data. Another filtering criterion is whether the end user is following a calculated route and/or route guidance. By collecting position and speed data of end users following a calculated route and/or route guidance, the quality of the data can be assumed to have minimal random stops or speed changes not associated with recurring delay points on the route. Other filtering criteria may include the time of day, such as avoiding rush hour traffic congestion. In other embodiments, the filtering criteria may include any other criteria.

In another embodiment, the navigation services server 52 may combine the steps of collecting the position and speed data and filtering the data. In this embodiment, the navigation services server 52 only collects position and speed data from end users that meet the filtering criteria. In another embodiment, the filtering step 92 may be skipped completely by the navigation services server 52.

At step 94, the navigation services server 52 saves the position and speed data. The navigation services server 52 may also save additional data, such as time, day of week, date, traffic conditions and weather conditions, associated with the position and speed data of the end user. Other additional data may include the road segment represented in the geographic database 30 on which the end user is located. The additional data may also include the ID of the end user, time day of week, date, weather conditions, traffic conditions or any other data.

In one embodiment, the navigation services server 52 saves the position data, speed data, and the other data together in a file or in a recurring delay data database 88. When the position data, speed data and the other data are saved, they are saved as related entries in the file or database 88 so that there is an indication that these data are related to each other. The recurring delay data database 30 is stored on a storage medium 98 that is accessible to the navigation services server 52. The storage medium 98 may include one or more hard drives or other storage media. From time to time, the data in the delay data database 88 are sent from the navigation services provider 54 to a central data collection facility 100 at step 96.

B. Central Data Collection Facility

A geographic database can be updated using data collected by a plurality of end users traveling in a geographic area. One method for updating a geographic database using information gathered by vehicles is described in U.S. Pat. No. 6,047,234, the entire disclosures of which is incorporated by reference herein.

Figure 6:
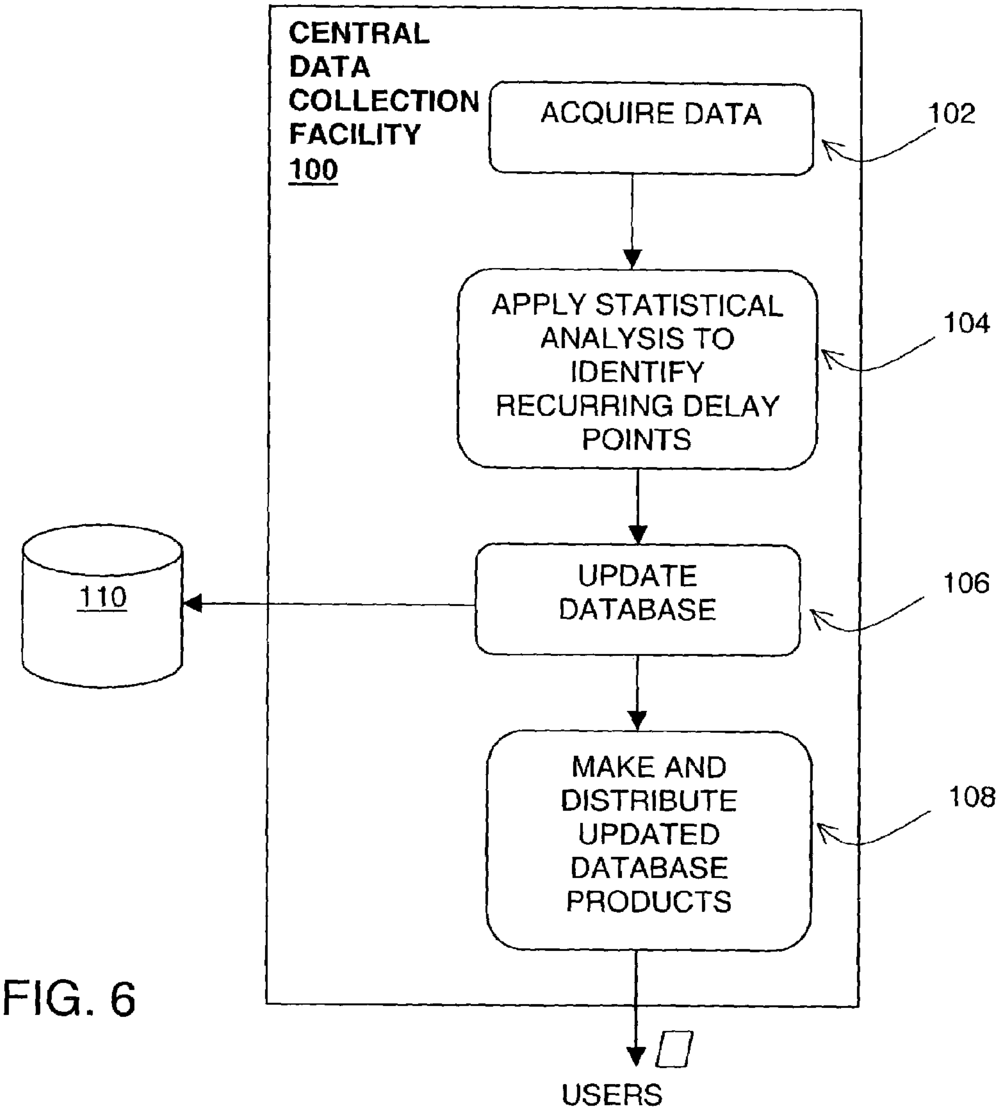
FIG. 6 is a flow chart of the operations of a central data collection facility.

According to one embodiment, the central data collection facility 100 updates the geographic database following the steps shown in FIG. 6. The central data collection facility 100 acquires the data from the navigation services provider 54 at step 102. The central facility 100 may obtain the data from the navigation services provider 54 by wireless data transmission or by other means (e.g., sending a diskette or via modem). In another embodiment, the central facility 100 may obtain data from other sources such as from a plurality of individual vehicles or any other sources.

The central facility 100 processes the data using statistical analysis techniques at step 104. The statistical analysis techniques analyze the position, speed and other data collected over time to identify the locations and attributes of recurring delay points. The data is collected for numerous days, weeks, months or any time frame to obtain a large sample of data for statistical analysis. In one embodiment, the data collected over time for each road segment is analyzed to identify any recurring delays associated with the road segment.

Figure 7:
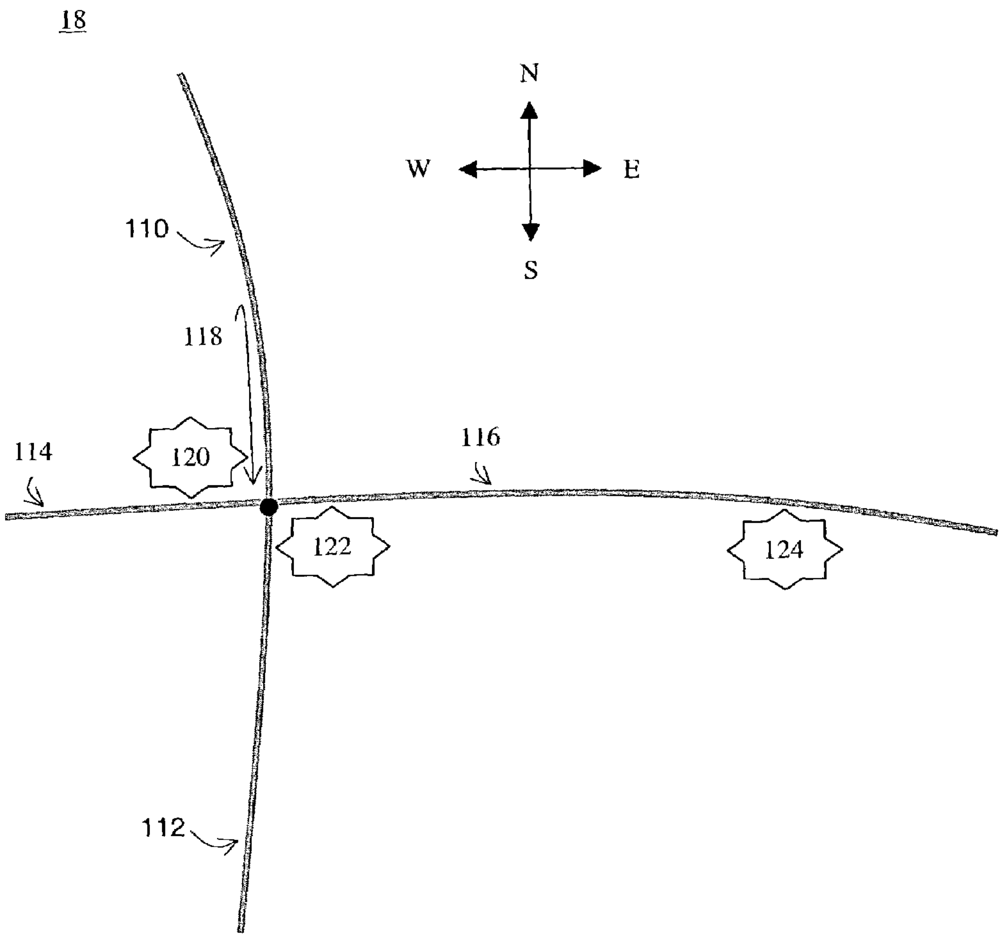
FIG. 7 shows the road segments of a portion of a geographic region.

FIG. 7 illustrates a portion of the road network 18 comprising a group of road segments 110, 112, 114 and 116. The central facility 100 processes the data for each road segment using the statistical analysis techniques to identify any recurring delay points associated with each road segment. The statistical analysis may discard certain data that may not accurately represent the speed changes and/or stops due to recurring delay points. In another embodiment, the central facility 100 may filter the data according to similar filtering criteria discussed above in conjunction with FIG. 5 at step 92.

The central facility 100 processes the data to identify changes in the speed data that are associated with a recurring delay point. For example, the statistical analysis may illustrate that a vast majority of end users traveling south on road segment 110 reduced their speed and eventually stopped prior to the intersection represented by node 118. Likewise, the statistical analysis may illustrate that a vast majority of end users traveling north on road segment 112 reduced their speed and eventually stopped prior to the intersection represented by node 118. The statistical analysis for this example identifies a recurring delay point associated with road segment 110 at position 120 for the south-bound direction, and a recurring delay point associated with road segment 112 at position 122 for the north-bound direction. The recurring delay may be attributed to many reasons, such as a traffic signal or stops sign at the intersection.

In addition to identifying recurring delay points at intersections, the statistical analysis may be used to infer the locations of other recurring delay points. For example, the statistical analysis may illustrate that end users traveling east on a road segment 116 reduced their speed from approximately the speed limit associated with the road segment to approximately fifteen miles per hour at point 124 or approximately thereabout. The recurring delay may be attributed to many reasons, such as a school zone, speed bump or curve in the road.

The statistical analysis may further identify whether the recurring delay is a permanent feature of the road segment or a temporary feature. For example, the statistical analysis may identify a position at which the majority of the end users abruptly reduce their speed followed by an increase in speed after crossing the position. The statistical analysis may further identify that this pattern exists for several weeks; however, after a certain date, the end users no longer reduced their speed at the position. The statistical analysis of this example identifies the likely presence of a temporary recurring delay that was removed from the position, such as road construction or a pothole. If the abrupt speed change remains for a considerable amount of time, such as several months, the statistical analysis establishes the likely presence of a permanent recurring delay, such as a speed bump, school zone or a curve in the road.

Furthermore, the statistical analysis of the speed and position data may identify positions of time dependent and/or weather dependent recurring delay points on road segments. For time dependent recurring delay points, the recurring delays may be present only at certain times of the day and/or present only for certain days of the week. For example, the statistical analysis may illustrate that at certain times of the day, such as weekdays between 4:30 pm and 4:45 pm, a majority of end users traveling on a road segment reduce speed at a certain position; however, the majority of the end users do not reduce speed at the position at other times. The recurring delay may be attributed to many reasons, such as a large parking lot exiting onto the road segment from which at 4:45 pm on weekdays nearly one thousand workers end their work shift. For weather dependent recurring delay points, the recurring delays may be present only during certain weather conditions. For example, the statistical analysis may illustrate that during rain showers, a majority of end users reduce speed at a position on the road segment.

Moreover, the statistical analysis may identify recurring delay points associated with traffic congestion at different times of the day. The statistical analysis may illustrate that at certain times of the day during heavy traffic conditions, a majority of the end users traveling on a road segment reduce speed and may have to stop at a certain position on the road segment. While at other times of the day during light traffic, the end users traveling on the road segment do not reduce speed.

In addition to identifying the location of the recurring delay points, the statistical analysis identifies other attributes of the recurring delay point. One attribute is a delay amount associated with each recurring delay point. For example, the statistical analysis may determine that the delay amount is an average time delay, such as five seconds, at the recurring delay point. Additionally, the statistical analysis may determine that the delay amount is an average speed reduction at the recurring delay point.

Figure 8:
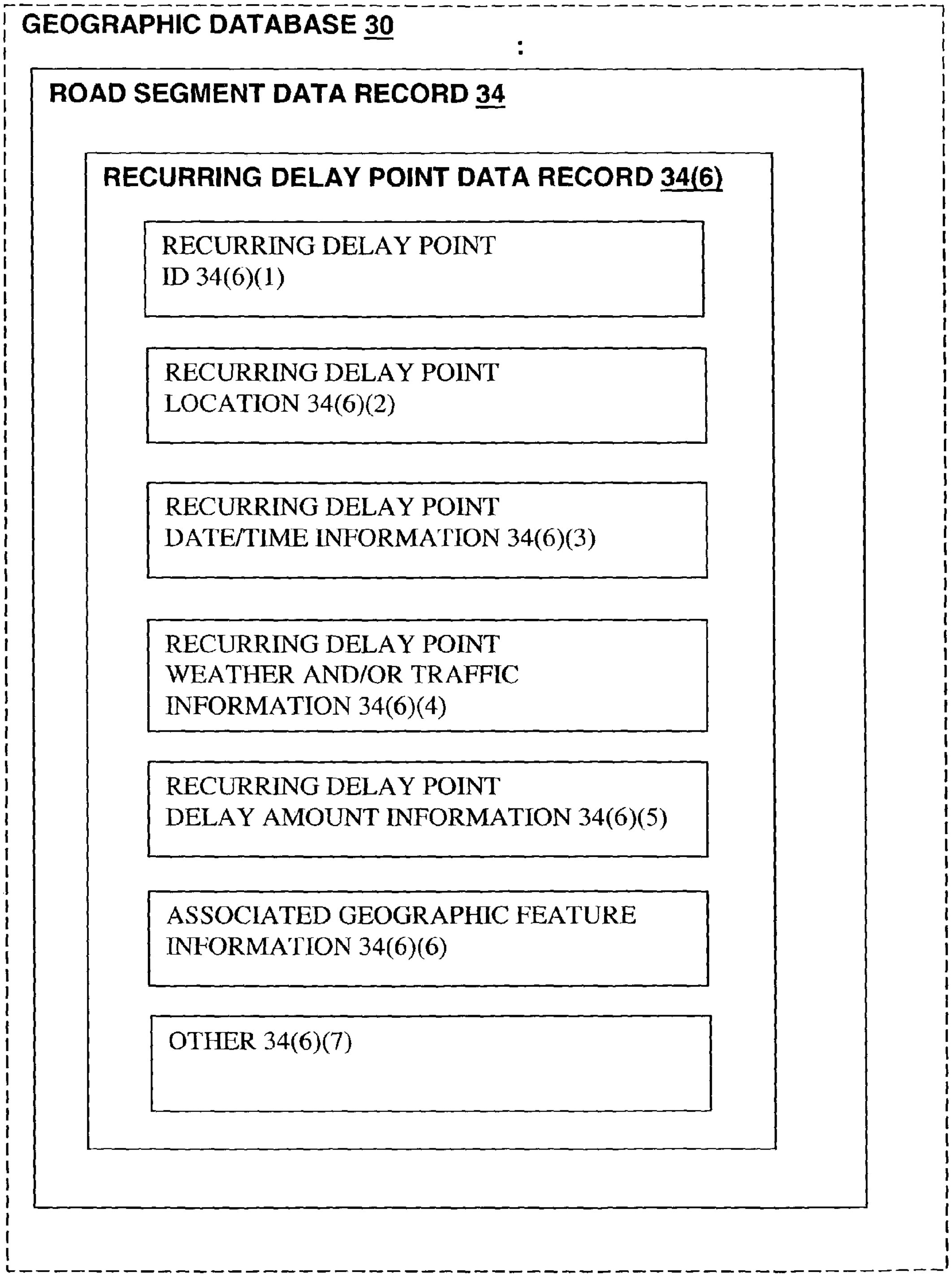
FIG. 8 is a block diagram showing a recurring delay point data record contained in the geographic database of FIG. 2.

After the statistical analysis, the recurring delay point data are stored in a master copy 110 of the geographic database at step 106. The recurring delay data may be stored as an attribute to the road segment data record 34. FIG. 8 shows some of the components of a recurring delay point data record 34(6). The recurring delay point data record 34(6) includes a recurring delay point ID 34(6)(1) by which the data record can be identified in the geographic database 30. The recurring delay point data record 34(6) also includes a recurring delay point location 34(6)(2) that identifies the approximate location of the recurring delay point on the road segment. In one embodiment, the location of the recurring delay point is represented as a position along the road segment, such as three feet from the end or node of the road segment. Included with the location information may be a direction of travel and/or a lane identification. For example, the statistical analysis may indicate that only end users traveling in one direction of the road segment and/or one of the road lanes the road segment incur the recurring delay point. In another embodiment, the location of the recurring delay point may be the geographic coordinates (e.g., the latitude and longitude). In another embodiment, the recurring delay point location may be stored as an attribute to a node data record 36. In a further embodiment, the location of the recurring delay point is represented as a position along the road segment and a certain distance from that position.

Each recurring delay point data record 34(6) has associated with it information (such as "attributes", "fields", etc.) that describe features of the represented recurring delay point. The recurring delay point data record 34(6) may include data that indicates recurring delay point date, day of week and/or time information 34(6)(3). For example, the statistical analysis may indicate that end users traveling the road segment incur the recurring delay point at specific days of the week and/or times of the day. The recurring delay point date and/or time information 34(6)(3) indicates the date, day or week and/or time at which the end users will incur the recurring delay point. Additionally, recurring delay points may occur when specific events occur, such as sporting events at a sporting arena. The recurring delay point date and/or time information 34(6)(3) may include a schedule of sporting events.

The recurring delay point data record 34(6) may also include data that indicates recurring delay point weather and/or traffic information 34(6)(4). For example, the statistical analysis may indicate that end users traveling the road segment incur the recurring delay point only during specific weather events. The recurring delay point weather information 34(6)(4) indicates the weather event during which the end users will incur the recurring delay point. Additionally, the statistical analysis may indicate that end users traveling the road segment incur the recurring delay point only during specific traffic conditions. The recurring delay point traffic information 34(6)(4) indicates the traffic conditions, such as heavy traffic, during which the end users will incur the recurring delay point.

The recurring delay point data record 34(6) may include data that indicates recurring delay point delay amount information 34(6)(5). For example, the statistical analysis may indicate that end users traveling past the recurring delay point experience an average delay time of an approximate number of seconds. The recurring delay point delay amount information 34(6)(5) indicates the amount of delay time that end users passing the recurring delay point will likely experience. Additionally, the recurring delay point delay amount information 34(6)(5) may provide the delay amount as an average speed reduction for a specified distance from the recurring delay point. For example, the statistical analysis may indicate that end users traveling past the recurring delay point experience a speed reduction of an approximate number of miles per hour. Additionally, the delay amount may be modeled in other ways.

Additionally, the recurring delay point data record 34(6) may include data that indicates associated geographic feature information 34(6)(6). For example, the recurring delay point may be caused by a traffic signal, traffic sign, traffic congestion, speed bump, pothole, road construction, curve in the road segment, school zone, railroad crossing, and any other geographic feature. The recurring delay point may even be caused by a point of interest, such as a popular shopping area. The associated geographic feature information 34(6)(6) indicates the geographic feature that causes the delay of the recurring delay point. Furthermore, the recurring delay point data record 34(6) may also include or be associated with other data 34(6)(7) that refer to various other attributes of the representing recurring delay point.

The recurring delay point data records 34(6) in the geographic database 30 may not necessarily include all the same types of data attributes. One reason for this is that the recurring delay points do not all have the same properties. For example, some recurring delay points may only be present during certain weather conditions, whereas other recurring delay points will always be present. Another reason why recurring delay point data records 34(6) in the geographic database 30 may not have the same data attributes is that some of the properties of a recurring delay point may not have been collected or confirmed, such as the associated geographic feature 34(6)(6).

The recurring delay point data that are stored in the master copy 110 of the geographic database may be used to update existing data or to add new data. For example, the master copy 110 of the database may already include recurring delay point data for a particular represented road segment. The new recurring delay point data obtained using the process described in FIGS. 5 and 6 can be used to update the existing data, e.g., confirm the existing data or make the existing data more accurate. Alternatively, the master copy 110 of the geographic database may not include recurring delay point data for a particular road segment. If new recurring delay point data are obtained for a road segment that is represented by a data record that does not already include a recurring delay point data attribute, the new recurring delay point data can be added as a new attribute of the data record.

In one embodiment, prior to updating existing data or adding new data to the master copy of the geographic database with the recurring delay point data, the existence, position and attributes of some the identified recurring delay points may be confirmed by direct observation of field personnel. Field personnel may further classify the cause of the recurring delay point upon direct observation. For example, upon directly observing recurring delay points at an intersection, the field personnel may identify the cause of the recurring delay points as traffic signals and add the traffic signals as attributes of the road segment to the geographic database 30.

The geographic database with new or improved recurring delay point data and other data can be used to make derived database products at step 108. The derived database products may include only portions of all the data in the master version 110 of the database. For example, the derived database products may include data that relate to only one or more specific regions. The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet. Moreover, the derived database product may be supplied to the navigation services provider 54 in FIG. 4.

The derived database products may be in a different format than the format in which the master copy of the database is maintained. The derived database products may be in a format that facilitates the uses of the derived products in the platforms in which they are installed. The derived database products may also be stored in a compressed format on the media on which they are located.

In an alternative embodiment, the navigation services server 52 of FIG. 4 may perform the steps of the central facility 100. In this embodiment, rather than sending the delay data to the central facility 100, the navigation services server 52 performs the statistical analysis on the recurring delay data to identify the recurring delay points. The navigation services server 52 then updates the geographic database 30 in a similar manner as performed by the central facility as described above. Additionally, the navigation services server 52 may make and distribute updated database products.

In another alternative embodiment, the central data facility 100 may perform the recurring delay mapping application 86 of the navigation services server 52. In this embodiment, the central facility 100 includes many of the features of the navigation services provider 54 enabling the central data facility 100 to collect position, speed and other data from the plurality of end users.

III. Alternatives

A. Standalone Navigation System

As explained above, there are different kinds of mobile and portable computing platforms that end users can use to obtain geographically-based features and services. These different kinds of mobile and portable computing platforms include standalone systems, such as in-vehicle navigation systems. With a standalone system, the navigation application software and geographic database are located locally, i.e., with the navigation system unit in the vehicle. The standalone systems are capable of performing the route calculation and route guidance applications.

Figure 9:
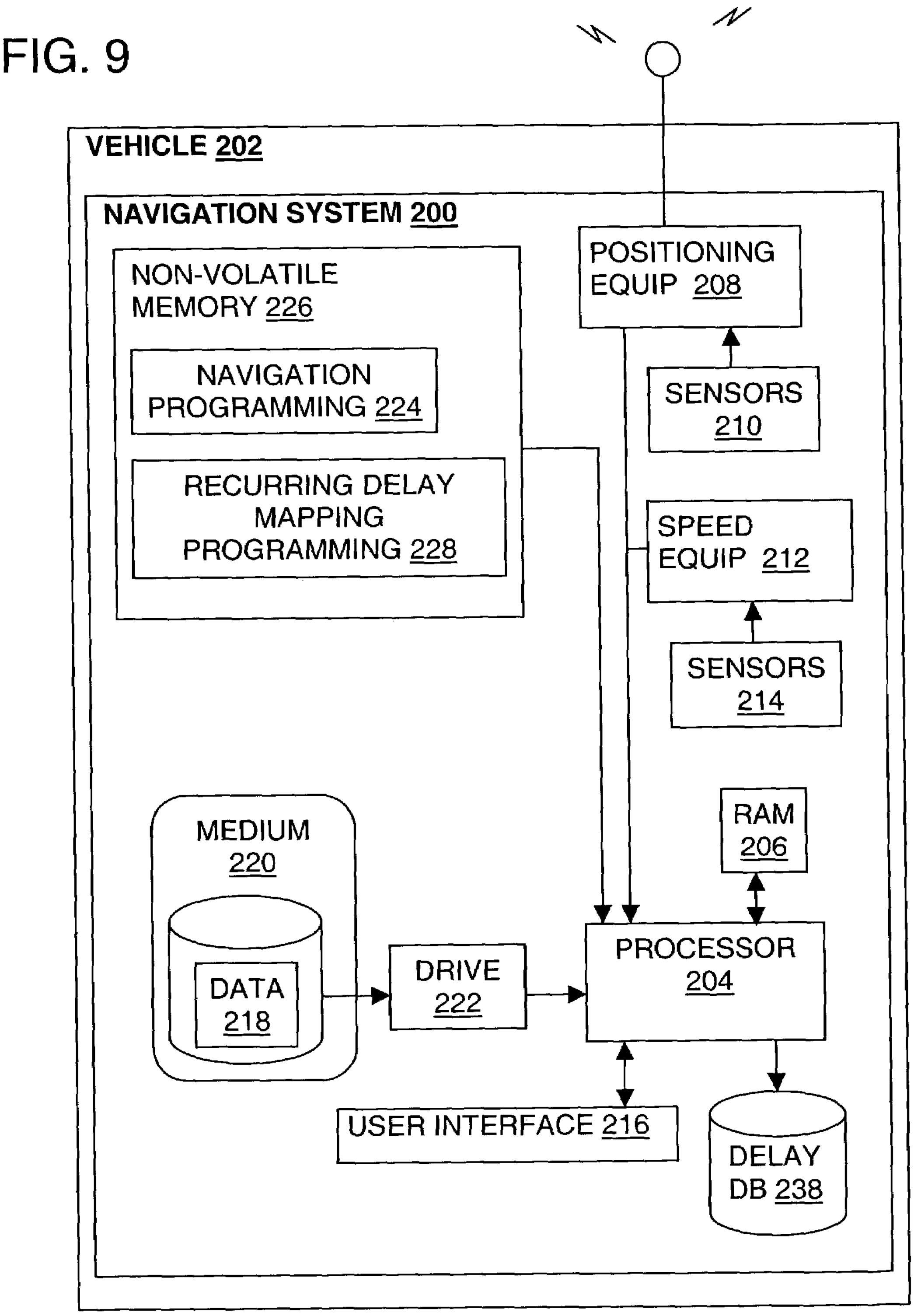
FIG. 9 is a diagram of a navigation system located in a vehicle.

In addition to providing navigation features, the standalone system may also collect recurring delay data. Referring to FIG. 9, there is a diagram illustrating an exemplary embodiment of a navigation system 200 capable of collecting recurring delay point data. In the embodiment shown in FIG. 9, the navigation system 200 is located in a vehicle 202, such as an automobile, truck, or bus. The navigation system 200 is a combination of hardware and software components. The hardware components of the navigation system 200 may include a processor 204, memory 206, and so on. The navigation system 200 also includes positioning equipment 208 that determines the position of the vehicle 202 in which it is installed. The positioning equipment 208 may include sensors 210 or other components that sense the speed, orientation, direction, angular acceleration, and so on, of the vehicle 202. The position equipment 208 may also include a GPS system. The navigation system 200 also includes speed equipment 212 that determines the speed of the vehicle in which it is installed. The speed equipment 212 may include sensors 214 or other components that sense the speed, orientation, direction, angular acceleration, and so on, of the vehicle 202. In another embodiment, the positioning equipment and speed equipment are combined. The navigation system 200 also includes other sensors for measuring weather conditions, such as a thermometer, barometer, wind speed and direction sensor and precipitation detector.

The navigation system 200 also includes a user interface 216. The user interface 216 includes appropriate means for receiving instructions and/or input from an end user of the navigation system 200. The instruction receiving means may include a keyboard, keypad, or other type of input panel, a microphone, as well as other means for accepting end-user input, such as voice recognition software, and so on, through which the end user may request navigation information and services. The user interface 216 also includes appropriate means for providing information back to the end user. The information providing means may include a display and speakers (including speech synthesis hardware and software) through which the end user can be provided with information and services from the navigation system 200.

All of the components described above may be conventional (or other than conventional) and the manufacture and use of these components are known to those of skill in the art.

In order to provide navigation features to the end user, the navigation system 200 uses geographic data 218. The geographic data 218 include information about one or more geographic regions or coverage areas. The geographic data 218 may be stored in the vehicle 202 or alternatively, the geographic data 218 may be stored remotely and made available to the navigation system 200 in the vehicle 202 through a wireless communication system which may be part of the navigation system 200. In another alternative embodiment, a portion of the geographic data 218 may be stored in the vehicle 202 and a portion of the geographic data 218 may be stored in a remote location and made available to the navigation system 200 in the vehicle 202 over a wireless communication system from the remote location.

In the embodiment shown in FIG. 9, some or all of the geographic data 218 are stored on a medium 220 which is located in the vehicle 202. Accordingly, the navigation system 200 includes a drive 222 (or other suitable peripheral device) into which the medium 220 can be installed and accessed. In one embodiment, the storage medium 220 is a CD-ROM disk. In another alternative embodiment, the storage medium 220 may be a PCMCIA card in which case the drive 222 would be substituted with a PCMCIA slot. Various other storage media may be used, including fixed or hard disks, DVD disks or other currently available storage media, as well as storage media that may be developed in the future.

Referring again to FIG. 9, in addition to the hardware components and geographic database, the navigation system 200 includes or uses navigation programming 224. The navigation programming 224 includes the software that provides for the functions and/or features performed by the navigation system 200. The navigation programming 224 uses the geographic data 218 in conjunction with input from the end user via the user interface 216, and possibly in conjunction with outputs from the positioning system 208, to provide various navigation-related features and/or functions, such as route calculation and route guidance.

The navigation programming 224 may be stored in a non-volatile storage medium 226 in the navigation system 200. Alternatively, the navigation programming 224 and the geographic data 218 may be stored together on a single storage device or medium. Alternatively, the navigation programming 224 may be located at a remote location and may be provided to or accessed by the navigation system 200 over a communications system. In one embodiment, the navigation programming 224 is written in the C programming language although in alternative embodiments other programming languages may be used, such as C++, Java, Visual Basic, and so on.

Figure 10:
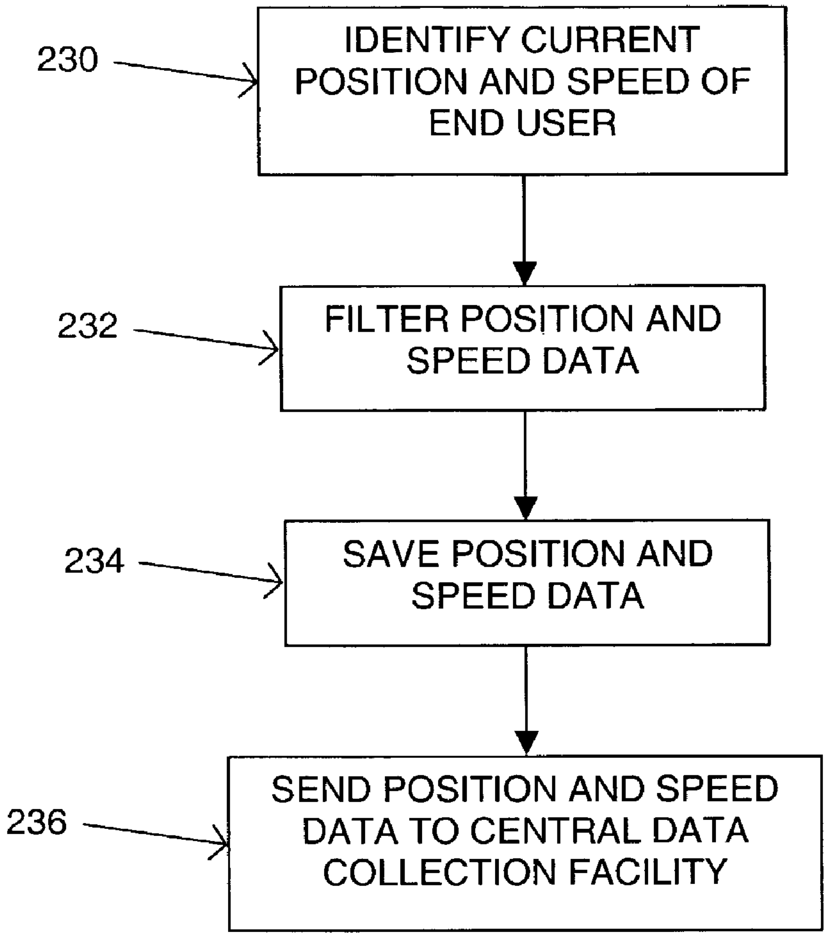
FIG. 10 is a flow chart of the operations of the navigation system of FIG. 9.

In addition to the navigation programming 224, the navigation system 200 includes recurring delay mapping programming 228. The recurring delay mapping programming 228 collects position, speed and other data of the vehicle 202 to be used for identifying the locations and attributes of recurring delay points. FIG. 10 is a flow chart of the steps performed by the processor 204 executing the recurring delay mapping programming 228.

As the vehicle 202 travel through the geographic region 18, the navigation system 200 identifies the current position and current speed of the vehicle 202 at step 230. The position of the vehicle 202 is determined with the positioning equipment 208 using the sensors 210. The positioning equipment 208 may determine the position routinely, such as every second. The speed of the vehicle 202 is determined with speed equipment 212 using the sensors 214. The speed equipment 212 may determine the speed routinely. In another embodiment, the speed information may be represented as velocity data comprising both the magnitude component and a direction component. The speed of the end user may be determined by other methods. In one embodiment, the speed and direction of travel may be determined using the position information. For example, the speed is calculated from the distance covered between the current position and the previous position, and from the elapsed time between the positions. The direction is a direction on the road segment from the previous position to the current position. In addition to the speed and position data, the navigation system 200 may also identify the time, day of week, date, current weather conditions, and any other data.

Referring to FIG. 10, at step 232, the navigation system 232 filters the raw position and speed data of the vehicle 202 into a filtered set of data according to specified filtering criteria. The filtering criteria may be selected such that the quality of the position and speed data can be assumed to have minimal random speed changes or stops not associated with recurring delay points. Additionally, the filtering criteria may be selected to identify recurring delay points in a particular portion of a geographic region. The filtering criteria may be established by a navigation system provider 54, by a geographic database provider or by the central facility 100. The filtering criteria may be selected as described above. In another embodiment, the navigation system 200 may combine the steps of collecting the position and speed data and filtering the data. In this embodiment, the navigation system 200 only collects position and speed data of the vehicle that meet the filtering criteria. For example, the navigation system 200 may collect position and speed data only when the vehicle 200 is traveling a calculated route.

After the position and speed data has been filtered, the navigation system 200 saves the position and speed data that met the filtering criteria at step 234. The navigation system 200 may also save additional data associated with the position and speed data of the vehicle 202. The additional data may include the road segment represented in the geographic database 218 on which the vehicle 202 is located. The additional data may also include the time, day of week, date, current weather conditions, and any other data.

In one embodiment, the navigation system 200 saves the position data, speed data, and the other data together in a file or in a delay data database 238. When the position data, speed data and the other data are saved, they are saved as related entries in the file or database 238 so that there is an indication that these data are related to each other. The delay database or file 238 is stored on a writable, non-volatile storage medium in the vehicle 202.

Referring to FIG. 10 at step 236, from time to time, the data in the delay data database 238 are sent from the vehicle 200 to the central data collection facility 100. In the above-described embodiment, the central data collection facility 100 acquires the delay data from the navigation services server 52. In the present embodiment, the central data collection facility 100 also acquires delay data from a plurality of vehicles 202. The central facility 100 may obtain the data from the vehicle(s) 202 by wireless data transmission or by other means (e.g., sending a diskette or via modem). After acquiring the delay data from the vehicles 202, the central facility 100 performs the statistical analysis to identify the recurring delay points and updates the geographic database as described above in conjunction with FIG. 6.

B. Applications for the Recurring Delay Point Information

The recurring delay point data associated with the represented road segments within the geographic database have several applications. First, the route calculation may use the recurring delay point information. As discussed above, the route calculation application may attempt to find a solution route that takes the least time to travel. In calculating the travel time for possible routes, each component road segment has an associated default segment cost or travel time. Using the recurring delay point information, a more accurate travel time for the component road segments may be estimated, and the best route may be selected. The recurring delay point delay amount data may be used to provide the more accurate travel time estimate. For example, the delay amount data may be used to determine the default segment cost or supplement the default segment cost. Similarly, the route calculation application may consider the presence of numerous recurring delay points and avoid those road segments. The recurring delay point data may be stored in an optimization database separate from the geographic database for use with routing calculations.

Additionally, the recurring delay point information may be used by the navigation system to provide safety warnings to end users. For example, the navigation system may inform the end user of a recurring delay point ahead. Moreover, the navigation system may inform the end user how to avoid the recurring delay point. For example, if a recurring delay point associated with the left lane of the road segment occurs ahead, the navigation system may inform the end user to change lanes to avoid the recurring delay point.

Furthermore, the database creator may use the recurring delay point data to collect information about the roads for the geographic database. For example, road geometry data may be obtained using aerial photographs or from public sources. Recurring delay point data may be collected using the navigation systems as described above. The database creator may then add the recurring delay points to road geometry data for the database. Additionally, the existence, position and attributes of some of the identified recurring delay points may be confirmed by direct observation of field personnel. Moreover, field personnel may further classify the cause of the recurring delay point upon direct observation. For example, upon directly observing a recurring delay point, the field personnel may identify the cause of the recurring delay point as a speed bump and add the speed bump as an attribute of the road segment to the geographic database 30.

Furthermore, accident avoidance and automated driver assistance systems may use the recurring delay point information. For example, the automated driver assistance systems may be alerted to a recurring delay point ahead. In one embodiment, the automated driver assistance system may focus road sensors, such as radar or cameras, to identify the recurring delay point ahead. Additionally, the automated driver assistance system may reduce the speed of the vehicle when approaching the recurring delay point. Moreover, the recurring delay points may be appropriately modeled and stored in the geographic database or in a separate database for use with automated driver assistance systems. When performing the statistical analysis to identify the recurring delay points, the statistical analysis may form a more precise mathematical model of each of the recurring delay points than the recurring delay point delay amount information illustrated in FIG. 8. For example, rather than the average delay time of an approximate number of seconds or the average speed reduction, the recurring delay data record may include a statistical distribution of the appropriate speed for a distance before and after the recurring delay point. The speed distribution may be a U-shaped or V-shaped distribution with the end users gradually reducing speed from the speed limit at a certain distance from the recurring delay point to a certain speed at the recurring delay point and increasing speed after the recurring delay point to the speed limit. Because the central data collection facility may have numerous speed and position data for a certain road segment, the statistical analysis may identify the recurring delay points and model how the end user should travel past the recurring delay. For example, if the recurring delay point is caused by a curve in the road segment, the statistical model of the recurring delay point provides the appropriate speed at points along the curve as determined by statistically analyzing the speed and position data of numerous vehicles traveling the road segment. The automated driver assistance systems may use the model of the appropriate speed along the curve to safely assist a vehicle around the curve identified as a recurring delay point.

Additionally, the recurring delay point information may be used by the navigation system with real time traffic to provide traffic warnings and alternative routes. In one embodiment, the recurring delay point data identifies the locations and attributes of recurring delay points associated with traffic conditions, such as heavy traffic and moderate traffic conditions. For example, the navigation system may receive a real time traffic broadcast that a road segment is currently experiencing high traffic conditions. The navigation system may then determine that the vehicle will encounter a recurring delay point associated with the heavy traffic condition. The navigation system provides the end user with a warning of the approaching recurring delay point and expected delay amount. Additionally, the navigation system may provide alternative routes to avoid the recurring delay point.

C. Examples of Recurring Delay Points

The following describes several examples of recurring delay points and is not a complete list of all possible recurring delay points. For convenience, the cause of the delay is identified when describing the recurring delay point. However, as described above, the cause or nature of the delay does not need to be determined to identify and model the recurring delay points.

One example of a recurring delay point is a stop sign. The statistical analysis may illustrate that a vast majority of end users traveling south on a road segment all reduced their speed and eventually stopped prior to an intersection with a stop sign. Thus, the statistical analysis identifies a recurring delay point associated with the road segment just prior to the intersection in the south-bound direction. The statistical analysis may also determine the delay amount as an average stop time associated with the recurring delay point. The statistical analysis may further determine other attributes of the recurring delay point. The statistical analysis may determine an average delay time for each direction of travel after the recurring delay point. For example, end users turning left from the recurring delay point may experience longer delay amounts than end users turning right. Additionally, the statistical analysis may determine a statistical distribution of likely stop positions associated with the recurring delay point. For example, not all end users will stop immediately at a stop line associated with the stop sign, some will stop several car lengths behind the stop line. The statistical analysis may also determine the average stop time and stop positions for the recurring delay point for various times of the day and days of the week. For example, at certain times of the day, such as rush hour, the average delay time may be considerably longer and the stop positions may be further away from the stop line. Additionally, during certain traffic conditions the delay amount may be longer and the stop positions may be further away from the stop line. Moreover, the statistical analysis may determine other attributes of the recurring delay point. All of these attributes of the recurring delay point determined by the statistical analysis may be stored as part of the recurring delay point data record.

Another example of a recurring delay point is a traffic signal. The statistical analysis may illustrate that a vast majority of end users traveling south on a road segment all reduced their speed prior to an intersection with a traffic signal. A portion of the end users stop prior to the intersection and a portion of the end users proceed through the intersection without stopping. Thus, the statistical analysis identifies a recurring delay point associated with the road segment just prior to the intersection in the south-bound direction. The statistical analysis may also determine the delay amount as an average stop time associated with the recurring delay point. The statistical analysis may further determine other attributes of the recurring delay point. The statistical analysis may determine an average delay time for each direction of travel after the recurring delay point. For example, end users turning left from the recurring delay point may experience longer delay amounts than end users turning right. Additionally, the statistical analysis may determine a statistical distribution of likely stop positions associated with the recurring delay point. For example, not all end users will stop immediately at a stop line associated with the traffic signal, some will stop several car lengths behind the stop line. The statistical analysis may also determine the average stop time and stop positions for the recurring delay point for various times of the day and days of the week. For example, at certain times of the day, such as rush hour, the average delay time may be considerably longer and the stop positions may be further away from the stop line. Additionally, during certain traffic conditions the delay amount may be longer and the stop positions may be further away from the stop line. Furthermore, the statistical analysis may establish timing patterns of the traffic signal. Moreover, the statistical analysis may determine other attributes of the recurring delay point. All of these attributes of the recurring delay point determined by the statistical analysis may be stored as part of the recurring delay point data record.

Another example of a recurring delay point is a speed bump. The statistical analysis may illustrate that a vast majority of the end users traveling east on a road segment reduced their speed from approximately the speed limit associated with the road segment to approximately fifteen miles per hour at a speed bump on the road segment or approximately thereabout. Thus, the statistical analysis identifies a recurring delay point associated with the road segment at approximately the location of the speed bump in the east-bound direction. The statistical analysis may also determine the delay amount as an average delay time associated with the recurring delay point. The statistical analysis may further determine other attributes of the recurring delay point. The statistical analysis may determine an average speed reduction for a distance from either side of the recurring delay point. Additionally, the statistical analysis may establish a speed distribution for a distance before and after the recurring delay point. For example, the statistical distribution illustrates that at approximately 50 feet from the recurring delay, the end users began reducing speed from approximately the speed limit associated with the road segment. The statistical distribution also illustrates that at approximately the recurring delay point, the end users travel at a speed of approximately fifteen miles per hour, and immediately after passing the recurring delay point, the end users accelerate to approximately the speed limit. The statistical analysis may also determine the average delay time, speed reduction and statistical distribution of speed for the recurring delay point for various times of the day, days of the week and traffic conditions. For example, at certain times of the day, such as rush hour, the delay amount may be considerably longer. All of these attributes of the recurring delay point determined by the statistical analysis may be stored as part of the recurring delay point data record.

A further example of a recurring delay point is a railroad crossing. The statistical analysis may illustrate that a majority of the end users traveling east on a road segment reduced their speed by approximately fifteen miles per hour at a railroad crossing on the road segment or approximately thereabout. However, a portion of the end users stop prior to the railroad crossing and remain stopped for a period of time. Thus, the statistical analysis identifies a recurring delay point associated with the road segment at the location of the railroad crossing in the east-bound direction. The statistical analysis may also determine the delay amount as an average delay time associated with the recurring delay point. The average delay time considers end users that travel past the recurring delay point without stopping and the end users that stop. The statistical analysis may further determine other attributes of the recurring delay point. The statistical analysis may determine an average speed reduction for a distance from either side of the recurring delay point. Additionally, the statistical analysis may establish a speed distribution of the typical speed for a distance before and after the recurring delay point. The statistical analysis may also determine the average delay time, speed reduction and statistical distribution of speed for the recurring delay point for various times of the day, days of the week and traffic conditions. Furthermore, the statistical analysis may establish times of the day at which the end users will have to stop for the recurring delay point because the trains follow a set schedule. Additionally, the statistical analysis may provide a probability of whether the end users will have to stop at the recurring delay point. All of these attributes of the recurring delay point determined by the statistical analysis may be stored as part of the recurring delay point data record.

Yet another example of a recurring delay point is a point of interest. The statistical analysis may illustrate that a portion of the end users traveling south-bound in the left lane of a road segment reduced their speed and some of the end users stopped adjacent an entrance to a point of interest. Thus, the statistical analysis identifies a recurring delay point associated with the south-bound direction, left lane of the road segment adjacent the entrance to the point of interest. The statistical analysis may also determine the delay amount as an average delay time associated with the recurring delay point. The statistical analysis may further determine other attributes of the recurring delay point. The statistical analysis may also determine the delay amount as an average speed reduction associated with the recurring delay point. The statistical analysis may also determine the average delay time and speed reduction for various times of the day, days of the week and traffic conditions. For example, at certain times of the day, such as lunch hour, the average delay time may be considerably longer for points of interest that serves a fast food menu. All of these attributes of the recurring delay point determined by the statistical analysis may be stored as part of the recurring delay point data record.

A further example of a recurring delay point is a traffic congestion point. The statistical analysis may illustrate that a majority of the end users traveling south-bound on a road segment reduced their speed just prior to an entrance ramp during certain time periods of the day. Thus, the statistical analysis identifies a recurring delay point associated with the south-bound direction just prior to the entrance ramp. The statistical analysis may also determine the delay amount as an average delay time associated with the recurring delay point. The statistical analysis may further determine other attributes of the recurring delay point. The statistical analysis may also determine the delay amount as an average speed reduction associated with the recurring delay point. The statistical analysis may also determine the average delay time and speed reduction recurring delay point for various times of the day, days of the week and traffic conditions. For example, at certain times of the day, such as rush hour, the average delay time and average speed reduction may be considerably larger than non-rush hour. Furthermore, the statistical analysis may model the delay amount to be used with real time traffic reports. For example, the statistical analysis may provide delay amounts corresponding to heavy, moderate and light traffic conditions. When the end user receives real time traffic information that the traffic is heavy, the end user's navigation system would use the delay amount for the recurring delay point corresponding to heavy traffic. All of these attributes of the recurring delay point determined by the statistical analysis may be stored as part of the recurring delay point data record.

It is intended that the foregoing detailed description be regarded as illustrative rather than limiting and that it is understood that the following claims including all equivalents are intended to define the scope of the invention.

I claim:

1. A method of obtaining data for a geographic database using a mobile computing platform moving in a geographic region comprising the steps of:

collecting speed and position data of the mobile computing platform as the mobile computing platform travels in the geographic region to provide collected speed and position data, wherein time data is collected with said collected speed and position data;

filtering the collected speed and position data to remove the collected speed and position data related to traffic congestion to provide filtered speed and position data;

evaluating the filtered speed and position data to identify a location of a recurring delay point at which the speed of the mobile computing platform is less than a speed limit for a road on which the mobile computing platform is located, wherein said recurring delay point comprises at least one of: a school zone, a railroad crossing, and a hill;

evaluating the filtered speed and position data to determine a delay amount associated with the recurring delay point, wherein said delay amount represents a speed reduction of the mobile computing platform from said speed limit at said location of the recurring delay point; and updating the geographic database to indicate the location and the delay amount of the recurring delay point.

2. The method of claim 1 wherein the collected speed and position data are provided over a wireless communications link from the mobile computing platform to a navigation services server.

3. The method of claim 1 wherein said step of collecting is performed by a program in the mobile computing platform.

4. The method of claim 1 wherein the mobile computing platform is a navigation system.

5. The method of claim 1 further including:

sending the collected speed and position data to a central data collection facility.

6. The method of claim 1 wherein said delay amount includes time information.

7. The method of claim 1 wherein said delay amount includes an average delay time.

8. The method of claim 1 wherein said delay amount is an average speed reduction.

9. The method of claim 1 wherein said delay amount is a statistical distribution of speed data associated with the recurring delay point.

10. The method of claim 1 further including:

identifying a time associated with the recurring delay point.

11. The method of claim 1 further including:

collecting weather condition data with said collected speed and position data.

12. The method of claim 11 further including:

identifying a weather condition associated with the recurring delay point.

13. The method of claim 1 further including:

collecting traffic condition data with said collected speed and position data.

14. The method of claim 13 further including:

identifying a traffic condition associated with the recurring delay point.

15. The method of claim 1 further including:

identifying a geographic feature associated with the recurring delay point.

16. A method of obtaining data for a geographic database representing a geographic region using a plurality of vehicles comprising the steps of:

recording speed and position data from each of said plurality of vehicles to provide recorded speed and position data;

sending the recorded speed and position data to a central facility;

filtering the recorded speed and position data to remove the recorded speed and position data related to traffic congestion to provide filtered speed and position data;

performing statistical analysis on said filtered speed and position data of the vehicles to identify a slow down location at which the recorded speed and position data indicates that a portion of said vehicles that pass said slow down location decrease said respective speed by at least a predetermined amount;

inferring a location of a recurring delay point at said identified slow down location, wherein said recurring delay point comprises at least one of: a school zone, a railroad crossing, and a hill;

determining a speed reduction amount associated with the identified slow down location; and storing data in the geographic database to indicate the location and the speed reduction amount of the recurring delay point.

17. The method of claim 16 wherein the speed and position data are collected by a navigation system associated with each of said vehicles.

18. The method of claim 16 further including:

filtering the recorded speed and position data according to another filtering criterion.

19. A method of collecting data for a geographic database that represents roads in a geographic region, the method comprising:

with a plurality of vehicles that travel along the roads, collecting speed and position data of said vehicles that travel along the roads to provide collected speed and position data;

filtering the collected speed and position data to remove the collected speed and position data related to traffic congestion to provide filtered speed and position data;

statistically analyzing said filtered speed and position data to identify a location at which a portion of said vehicles that pass said location decrease said speed to infer a location of a recurring delay point, wherein said recurring delay point comprises at least one of: a school zone, a railroad crossing, and a hill;

evaluating said filtered speed and position data to determine a time delay associated with the recurring delay point; and storing data in said geographic database to indicate the location and time delay of said recurring delay point.

20. The method of claim 19 further including:

inferring a position of a stop line associated with said recurring delay point.

21. The method of claim 1, wherein the geographic database comprises data that represent a plurality of geographic features.

22. The method of claim 16, wherein the geographic database comprises data that represent a plurality of geographic features.

23. The method of claim 19, wherein the geographic database comprises data that represent a plurality of geographic features.

* * * * *